United States Patent
Hild et al.

(10) Patent No.: US 12,428,498 B2
(45) Date of Patent: Sep. 30, 2025

(54) PROCESS FOR PRODUCING A CROSSLINKED CELLULOSE ETHER

(71) Applicant: Dow Global Technologies LLC, Midland, MI (US)

(72) Inventors: Alexandra Hild, Soltau (DE); Jöerg Neubauer, Hamburg (DE); Sonja Menz, Wedemark (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 97 days.

(21) Appl. No.: 17/428,649

(22) PCT Filed: Apr. 17, 2020

(86) PCT No.: PCT/US2020/028661
§ 371 (c)(1),
(2) Date: Aug. 5, 2021

(87) PCT Pub. No.: WO2020/223037
PCT Pub. Date: Nov. 5, 2020

(65) Prior Publication Data
US 2022/0112311 A1 Apr. 14, 2022

Related U.S. Application Data

(60) Provisional application No. 62/841,376, filed on May 1, 2019.

(51) Int. Cl.
C08B 15/00 (2006.01)
C04B 24/38 (2006.01)
C08B 11/08 (2006.01)
C08B 11/20 (2006.01)

(52) U.S. Cl.
CPC .......... C08B 15/005 (2013.01); C04B 24/383 (2013.01); C08B 11/08 (2013.01); C08B 11/20 (2013.01)

(58) Field of Classification Search
CPC ....... C08B 15/005; C08B 11/08; C08B 11/20; C04B 24/383
See application file for complete search history.

(56) References Cited

U.S. PATENT DOCUMENTS

| | | | |
|---|---|---|---|
| 4,068,068 A * | 1/1978 | Holst | C08B 15/10 536/87 |
| 4,321,367 A | 3/1982 | Cheng et al. | |
| 6,235,893 B1 | 5/2001 | Reibert et al. | |
| 6,958,393 B2 | 10/2005 | Schlesiger et al. | |
| 7,504,498 B2 * | 3/2009 | Berglund | C08B 11/02 536/84 |
| 7,803,196 B2 * | 9/2010 | Maruyama | D06M 15/55 8/129 |
| 2005/0034636 A1 | 2/2005 | Schlesiger et al. | |
| 2018/0099906 A1 * | 4/2018 | Hild | C08B 15/005 |

FOREIGN PATENT DOCUMENTS

| | | |
|---|---|---|
| CN | 1523048 A | 2/2004 |
| CN | 101243131 A | 8/2006 |
| CN | 104448010 | 3/2015 |
| DE | 10233788 | 2/2004 |
| DE | 10337011 | 3/2005 |
| EP | 1384727 B9 | 12/2008 |
| KR | 2013067748 | 6/2013 |
| WO | 2015165588 | 11/2015 |
| WO | 2017004119 | 1/2017 |
| WO | 2017004120 | 1/2017 |

OTHER PUBLICATIONS

Bartelmus, "Die Analytik von Celluseathergruppen" Z. Anal. Chem, 1976, Abstract, vol. 286.
Muhuo, Polymer Chemistry, China Textile & Apparel Press, 1999, 2nd edition, p. 243.
Office Action from corresponding Chinese Application No. 202080031762.1 dated Jun. 24, 2022.

* cited by examiner

Primary Examiner — Eric Olson
Assistant Examiner — Samuel L Galster

(57) ABSTRACT

A process for producing a crosslinked cellulose ether including the steps of: (a) contacting at least one cellulose material with at least one alkalization reagent to form an activated cellulose material; (b) contacting the activated cellulose material of step (a) with at least one etherification reagent to form an uncrosslinked cellulose ether; (c) subjecting the cellulose ether of step (b) to a simultaneous or stepwise washing and/or granulating step; (d) adding at least one crosslinking agent to the uncrosslinked cellulose ether during the washing and/or granulating of step (c) to form a crosslinked cellulose ether; and (e) any other optional components desired; and a crosslinked cellulose ether produced by the above process.

14 Claims, 2 Drawing Sheets

PROCESS FOR PRODUCING A CROSSLINKED CELLULOSE ETHER

FIELD

The present invention relates to a process for producing a crosslinked cellulose ether and a crosslinked cellulose ether prepared by such process.

BACKGROUND

Cellulose derivatives, such as cellulose ethers owing to their excellent properties and physiological safety, are used widely, for example as thickeners, adhesives, binders and dispersants, water retention agents, protective colloids, stabilizers, and suspension, emulsifying and film-forming agents. In addition, cellulose ethers are known to be employed in drymix mortars in various construction applications to improve the rheology of the mortar. Also, cellulose ethers are used in mortars to impart water retention properties that limit loss of water from the mortar to absorbing substrates. This ensures that the hydraulic binder (cement or gypsum) has sufficient water available during the setting reaction resulting in high mechanical strength of the final product. The lack of water would result in incomplete setting, poor mechanical strength, crack formation and low abrasion resistance.

Heretofore, cellulose ethers have been produced by well-known conventional processes which includes subjecting a cellulose starting material, such as cellulose pulp, to two process operations (steps or stages): (1) an alkalization operation and (2) an etherification operation. The well-known state-of-the-art conventional procedure for making a cellulose ether, is illustrated and described, for example, in U.S. Pat. No. 6,235,893 B1. The conventional process includes the steps of: (1) alkalizing a cellulose pulp; and (2) etherifying the alkalized cellulose pulp to form a cellulose ether. For example, in the conventional processes, the cellulose pulp is alkalized with sodium hydroxide and etherified with methyl chloride and alkylene oxide (ethylene oxide or propylene oxide). And, each one of the above operations of alkalization and etherification can be carried out stepwise, i.e. in one step or in two or more distinct and separate steps, and each step can be carried out for a predetermined period of time at specified process conditions of pressure and temperature. After the cellulose ether is made, the cellulose ether can be subjected to further desired process steps such as: (c) washing the cellulose ether; (d) drying the cellulose ether; and (e) milling the cellulose ether to a particulate form. Typically, the alkalization and etherification operations can be carried out in a single reactor or two or more reactors.

More recently, improvements have been made to conventional processes for making cellulose ethers by using crosslinking technology to make crosslinked cellulose ethers. Crosslinking technology involves cellulose ethers that can be chain extended or crosslinked using bifunctional crosslinking agents like methylene dichloride, epichlorohydrin or various diglycidylethers. For example, U.S. Pat. No. 6,958,393 B2 (equivalent to EP1384727B9) discloses a method of making a polyether group containing crosslinked cellulose ether using crosslinking technology. The crosslinked cellulose ether is produced by crosslinking a cellulose ether at 90 degrees Celsius (° C.) or less, in an inert atmosphere, e.g. nitrogen ($N_2$), in the presence of a polyether group containing crosslinking agent and in the presence of caustic or alkali. The crosslinking of the cellulose ether takes place in a reactor in which the cellulose ether itself is made and in the presence of the caustic or alkali.

One advantage of using a crosslinked cellulose ether, for example in a drymix mortar formulation, as opposed to a pure non-crosslinked cellulose ether is that by crosslinking a cellulose ether with a crosslinking agent, the viscosity of the aqueous solution of a cellulose ether can be increased and the resultant crosslinked cellulose ether having an increased or high viscosity can still remain water-soluble in an aqueous solution. And, a crosslinked cellulose ether having an increased or high viscosity, produced using crosslinking technology, can be used, for example in mortar applications, at a reduced dosage level without compromising product and application performance. Cellulose ether is a relatively expensive ingredient used in mortar formulations, and any reduction of the cellulose ether dosage in the formulation can save formulation costs.

In previously known processes, the dosage of a crosslinking agent, used in crosslinking a cellulose ether, is kept very low so as to prevent "over crosslinking" which, in turn, provides a crosslinked polymer product which remains water-insoluble and does not contribute to the viscosity of the aqueous solution. However, a uniform distribution of a small amount of crosslinking agent, added to the contents of a large reactor, is very difficult to realize using the previously known processes.

"Over crosslinking" herein, with reference to crosslinking a cellulose ether, means that the reaction of the cellulose ether with a crosslinking agent is too extensive and results in a 3-dimensional network of covalently linked cellulose ether chains; and such chains are not water soluble and appear as gel particles in an aqueous phase. Over crosslinking results in a reduction of water solubility of the cellulose ether in the aqueous solution. When over crosslinking occurs in a cellulose ether a reduced amount of the resulting crosslinked cellulose ether is soluble in the aqueous solution; and the appropriate viscosity of the crosslinked cellulose ether is unable to be achieved in the aqueous solution. In other words, over crosslinking results in an undesirable decrease in viscosity. An over crosslinked cellulose ether shows a degree of crosslinking that results in a reduced water solubility compared to a non-over crosslinked cellulose ether.

The known process for crosslinking a cellulose ether described, for example, in U.S. Pat. No. 6,958,393 B2 includes several steps such as: (1) a cellulose is alkalized with aqueous alkali metal hydroxide solution in the presence of a suspension medium; (2) the alkalized cellulose is reacted with one or more alkylene oxides; (3) the alkalized cellulose is reacted with an alkyl halide present in the suspension medium; (4) subsequently or simultaneously, the alkalized cellulose is reacted with a crosslinking agent using a specified amount of crosslinking agent; (5) further alkali metal hydroxide and/or alkalization reagent is added to the reaction mixture of step (4); and (6) the resultant crosslinked cellulose ether is purified and dried.

The process described in U.S. Pat. No. 6,958,393 B2 requires: (1) the addition of a crosslinking agent during the etherification step of the process at a high pressure; (2) the use of epichlorohydrin (ECH) as a crosslinking agent in some examples; (3) the addition of a low level of crosslinking agent in a pure state or dispersed in an organic solvent; (4) the uniform distribution of the crosslinking agent at the limited low level of pure crosslinking agent; and (5) the exhibition of good performance of the resulting products of the process. In addition to the above requirements, the use of the above known process, in some instances, has resulted in poor distribution of the crosslinking agent in the reactor; and has developed over crosslinking and an undesirable decrease in viscosity of the crosslinked cellulose product. And, the efficiencies of the known process of U.S. Pat. No. 6,958,393 B2 do not readily transfer from the laboratory scale, to the pilot plant scale, and/or ultimately to the full-size industrial plant scale. Thus, a greater degree of expertise, knowledge and technical effort is needed to make the above known process work on a plant scale; and under the conditions of the known process.

It has been found that to carry out a successful crosslinking process, it is necessary to achieve a uniform distribution of the crosslinking agent when the crosslinking agent is introduced into the process at a low amount. The uniform distribution has to be achieved to create the desired branched polymer and to prevent local over dosage which leads to over crosslinking. Over crosslinking (i.e., high levels of crosslinking) leads to localized crosslinked networks and increased levels of local insoluble materials. It has also been found that over crosslinking may depend on when and at what stage, step or operation of the crosslinked cellulose ether production process a crosslinking agent is introduced into the process. For example, a crosslinking agent might be introduced or added before, during, or after the etherification operation. However, since the alkalization and etherification reactions are exothermic, there are many factors that can affect whether or not over crosslinking occurs in the process. Factors can include, for example, the reaction time, type of crosslinking agent introduced into the process, the amount of crosslinking agent introduced into the process, how the crosslinking agent is introduced into the process, the process conditions at the point of introducing the crosslinking agent into the process, and over what period of time is the crosslinking agent introduced into the process.

It is desired, therefore, to provide a new improved process for producing a crosslinked cellulose ether that can be used and implemented on an industrial plant scale with a higher efficiency than known conventional processes; and at the same time, wherein the performance of the resulting products of such improved process remains the same or better than known conventional processes.

SUMMARY

The problems of the prior art processes can be solved using the process of the present invention. The present invention is directed to a novel process for preparing a crosslinked cellulose ether (herein referred to as "XCE") having an appropriate increased viscosity.

The present invention is directed to a novel low-pressure (e.g., at atmospheric pressure) process for preparing a XCE having an enhanced viscosity of the aqueous solution. The present invention relates to providing a crosslinking agent dosage in the cellulose ether production process at atmospheric pressure which enables the production of XCEs, such as hydroxyethyl methylcellulose derivatives, which not only eliminates a cost intensive high-pressure dosage step of the known prior art processes, but also provides a XCE product with increased viscosity of the aqueous solution. Such XCE product can be used at a reduced dosage, for example in drymix mortar formulations, and still provide appropriate performance properties.

In one embodiment, the crosslinking agent dosage takes place at a low-pressure step which, in the present invention process is, for example, during a washing and/or a granulation step of the process which are steps that are performed after, and downstream from, the high-pressure etherification process step. In the present invention, control of the dosage of the crosslinking agent provides an economical way to produce a XCE product with the good rheological performance (higher viscosity level), but with less technical effort. Also, the dosage concept of the present invention has the further benefit of an enhanced process window for crosslinking agent addition compared to known processes.

In one preferred embodiment, the present invention is directed to a process for producing a XCE including the steps of:
(a) contacting at least one cellulose material with at least one alkalization reagent to form an activated cellulose material such that the activated cellulose material forms at a pressure of, for example, less than or equal to (≤) 500 kilopascals (kPa); and at a temperature of, for example, ≤50° C.;
(b) contacting the activated cellulose material of step (a) with at least one etherification reagent to form an uncrosslinked cellulose ether;
(c) subjecting the uncrosslinked cellulose ether of step (b) to a step selected from:
 (ci) a washing step and a granulating step, wherein the washing step and the granulating step are performed simultaneously; or
 (cii) a washing step and a granulating step, wherein the washing step is a step separate from the granulating step; and wherein the washing step and the granulating step are performed separately in a stepwise procedure; or
 (ciii) a washing step only; or
 (civ) a granulating step only; and
(d) adding at least one crosslinking agent to the uncrosslinked cellulose ether such that the at least one crosslinking agent and the uncrosslinked cellulose ether form a crosslinked cellulose ether; wherein the crosslinking agent is added to the process:
 (di) during the washing step (ci) and during the granulating step (ci); or
 (dii) during the washing step (cii) and during the granulating step (cii); or
 (diii) only during the washing step (cii); or
 (div) only during the granulating step (cii); or
 (dv) during the washing step (ciii); or
 (dvi) during the granulating step (civ).

In an optional preferred embodiment, the XCE from step (d) can be subjected to one or more steps selected from a further purifying step, a drying step, and a milling step.

In another embodiment, the present invention is directed to a XCE produced by the above process.

Still another embodiment of the present invention relates to a mortar-forming composition including the above XCE.

Surprisingly, it has been found that the addition of a crosslinking agent to a cellulose ether during the washing step and/or the granulation step at atmospheric pressure results in a more uniform distribution and subsequently in a more robust viscosity increase of the aqueous solution of the cellulose ether, fairly independent from the dosage level in a wide process window of the crosslinking agent. This in contrast to the addition of a crosslinking agent during the etherification step at a higher pressure as required in the previously known processes.

Some other benefits of the present invention process include, for example, (1) control of the dosage of the crosslinking agent can result in a XCE with an advantageous desired (and appropriate) increased viscosity level that avoids over crosslinking and particularly during use in a large scale plant process; (2) the process is a low-pressure process and special high pressure equipment is not required; (3) a low amount of crosslinking agent is required in the process; (4) a uniform distribution of the low amount of crosslinking agent is possible in a large plant scale process; and (5) the process requires no additional spray devices in the reactor used to carry out the process of the present invention.

Furthermore, advantageously the process of the present invention provides a XCE product with the same or better performance properties of known products prepared by known processes. In addition, advantageously the process of the present invention can be performed on a large plant scale with the crosslinking agent dosage taking place at the washing step and/or the granulation step of the present invention process and without the problem of over-crosslinking.

BRIEF DESCRIPTION OF THE DRAWINGS

The process of the present invention is illustrated by the following drawings, but is not to be limited thereby, wherein the same reference numbers are used to refer to like elements in the drawings.

DETAILED DESCRIPTION

Figure 1:
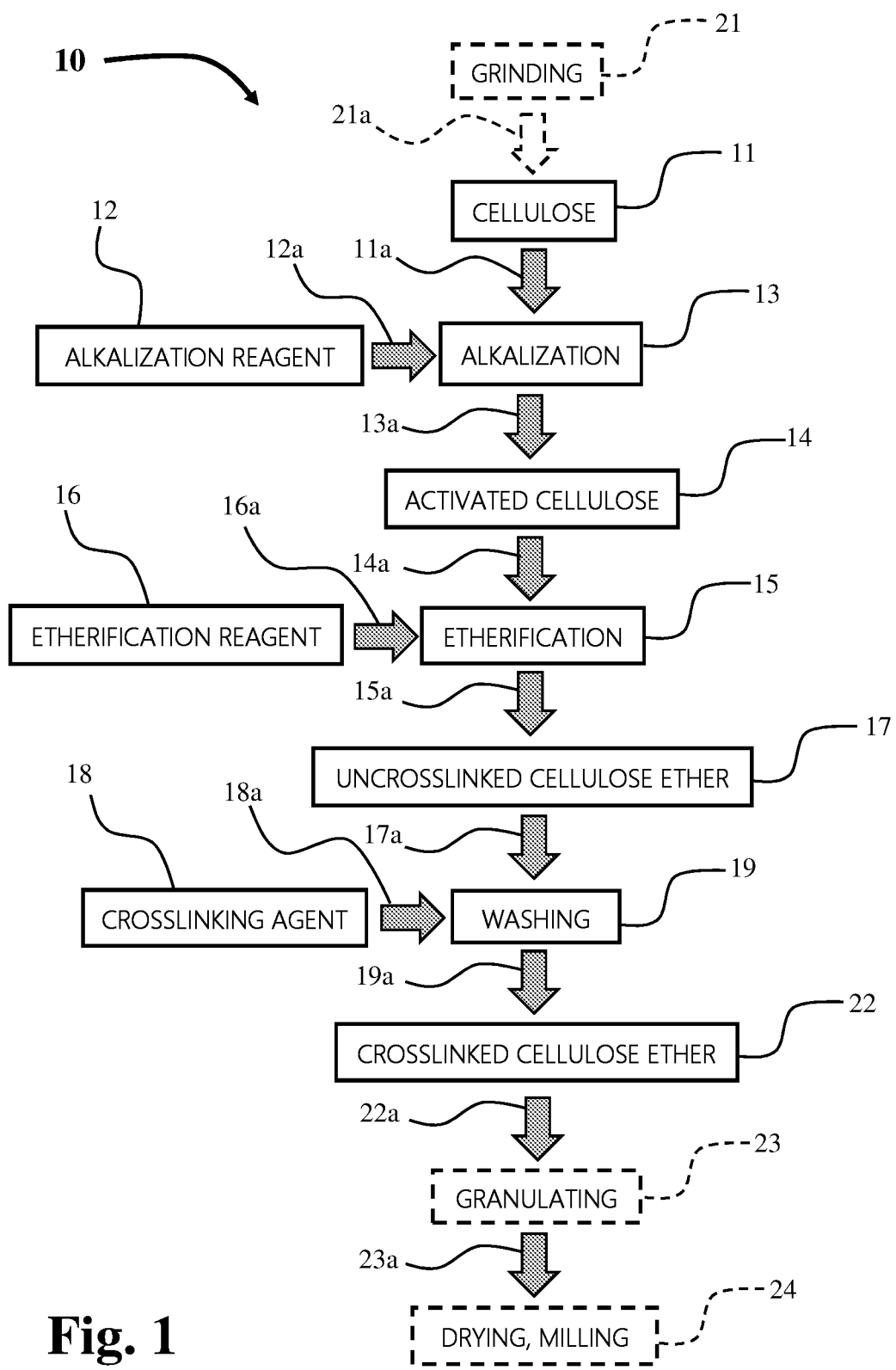
FIG. 1 is a schematic flow diagram showing one process of the present invention.

A "uniform distribution" in the present disclosure and with reference to contacting a cellulose fiber to a different component, herein means the cellulose fiber and the other component have the same distribution in all smallest volume elements of a given volume. The smallest volume element is a cube with an edge length of ten times the mean particle size of the cellulose fiber in the given volume.

In general, a process for producing a XCE includes an alkalization step and an etherification step. A step of grinding the cellulose starting material can be carried out, and typically is desired, prior to the alkalization step; and a step of washing (e.g., with hot water ($H_2O$)), granulating, drying, and/or milling the XCE can be carried out, and typically is desired, after the etherification step. In the present invention process, a crosslinking agent is introduced or added to a washing operation, a granulation operation or to both the washing operation and the granulation operation to contact an uncrosslinked cellulose ether and to provide crosslinking of the uncrosslinked cellulose ether.

operation later conducted downstream of the etherification step of the process. In another preferred embodiment, the crosslinking agent is added to, or dosed into, the granulation operation of the process which is also an operation later conducted downstream of the etherification step of the process. In still another preferred embodiment, the crosslinking agent is added to, or dosed into, both the washing operation and the granulation operation of the process. For example, in the embodiment where the crosslinking agent is added to both the washing operation and the granulation operation of the process a first portion of the crosslinking agent can be added to the washing step and a second portion of the crosslinking agent can be added to the granulating step.

The dosage of the crosslinking agent used in the present invention results in an ultrahigh viscous product with the same rheological performance (e.g., a high viscosity level) of products prepared by known processes; advantageously however, the process of the present invention provides a broader process window than a conventional process.

The crosslinking agent dosage used in the present invention has the benefit of dosing the crosslinking agent at a process point of the overall process of the present invention where process conditions are favorable for introducing the crosslinking agent into the process; and such that the objective of providing a uniform distribution of the crosslinking agent in the uncrosslinked cellulose ether can be achieved more easily compared to conventional processes. In addition, the present invention process does not have the safety issues and environmental concerns in a XCE manufacturing plant as do the processes known in the art which use a toxic crosslinking agent.

Further benefits of the present invention process include, for example, (1) the process uses a readily available crosslinking agent based on diglycidyl ether chemistry such as Epilox M985 or Epilox P13-42; (2) the crosslinking agent is non-toxic; and (3) the crosslinking agent is non-water soluble or only very poorly water soluble. In contrast, known processes use epichlorohydrin (ECH) as the crosslinking agent system; and such known processes suffer from several disadvantages, including, for example, epichlorohydrin: (1) is known to be toxic, (2) is a carcinogenic, and (3) has a low boiling point (116° C.)/low molecular weight (Mw) (92.53 $g \cdot mol^{-1}$). Table I describes a comparison of the physical data of an Epilox crosslinking agent versus epichlorohydrin crosslinking agent.

TABLE I

Physical Data of Crosslinking Agents

| Crosslinking Agent | Density ($g/cm^3$ at [@] 20° C.) | Dynamic Viscosity (mPa · s, @25° C.) | Solubility in Water (g/L, @25° C.) | Boiling Point (° C.) | Molar Mass (g/mol) |
|---|---|---|---|---|---|
| Epilox M985 | 1.06-1.06 | 40-90 | less than 100 | more than 200 | 850-1,000 |
| Epilox P13-42 | 1.04 | 40-70 | less than 100 | more than 200 | 610-700 |
| Epichlorohydrin | 1.18 | 1.03 | 65.9 | 117 | 92.5 |

In one broad embodiment, the present invention relates to the crosslinking agent dosage and crosslinking agent addition to the process for producing a XCE product. In one preferred embodiment, the crosslinking agent is added to, or dosed into, the washing operation of the process which is an The process of the present invention provides an irreversibly XCE with beneficial rheological behavior and advantageous properties in various fields of application. The present invention uses a C10-C24 alkyl bifunctional compound (oxirane and/or halide) and polypropylene glycol diglycidyl ethers as a crosslinking agent to prepare a XCE ether. In the process of the present invention, the crosslinking agent is introduced into the washing step and/or the granulation step of the process. Prior art processes that use ECH as a crosslinking agent to prepare a XCE results in insoluble XCE products. And, the crosslinking agent useful in the present invention is less of an environmental concern than ECH.

In one broad embodiment, the process of the present invention for producing a XCE includes the steps of: (a) contacting at least one cellulose material with at least one alkalization reagent to form an activated cellulose material such that the activated cellulose material forms at a low pressure; (b) contacting the activated cellulose material of step (a) with at least one etherification reagent to form an uncrosslinked cellulose ether; (c) subjecting the uncrosslinked cellulose ether of step (b) to a washing step and/or a granulating step; and (d) adding at least one crosslinking agent to the uncrosslinked cellulose ether during the washing operation, during the granulation operation or to both during the washing operation and the granulation operation such that the at least one crosslinking agent and the uncrosslinked cellulose ether form a crosslinked cellulose ether. Optionally, the XCE from step (d) above can be subjected to one or more steps of further purifying, drying, and milling.

With reference to FIG. 1, there is shown one broad embodiment of the present invention process, generally indicated by reference numeral 10, with various general process operations or steps for producing a XCE having an enhanced viscosity of the aqueous solution. The XCE produced using the process of the present invention can be used, for example, in mortar formulations. As shown in FIG. 1, process 10 for producing the XCE 22 includes, for example: an alkalization step 13; an etherification step 15; a washing step 19 (typically, washing with hot water); an optional cellulose grinding step 21 at the front end of the process; an optional granulation step 23; and an optional drying/milling step 24 which can be performed after the washing step 19 and/or the granulation step 23. In one embodiment as shown in FIG. 1, the washing step 19 and the granulation step 23 are carried out in a stepwise manner, i.e., in two separate steps wherein the washing step 19 is performed followed by the granulation step 23.

In FIG. 1, there is shown a cellulose starting material 11 such as pulp and an alkalization reagent 12 that proceed, as indicated by arrows 11a and 12a, respectively, to the alkalization step 13; and the mixture of the cellulose starting material 11 and the alkalization reagent 12 is subject to the alkalization step 13. The general process, as illustrated in FIG. 1, can include optional steps (or operations) such as, for example, the aforementioned optional grinding step 21, shown in dotted lines in FIG. 1, wherein the cellulose starting material such as pulp sheet can be ground to form a ground flock of cellulose material 11 which then proceeds, as indicated by arrow 11a, to the alkalization step 13.

With reference to FIG. 1 again, the optional grinding step 21, shown in dotted lines in FIG. 1, can be carried out to provide a ground particulate cellulose material which, in this instance, is transformed, as indicated by arrow 21a, into the cellulose material 11. In a preferred embodiment, the ground cellulose material 11 in particulate form, proceeds, as indicated by arrow 11a, to the alkalization step 13. Although the grinding step 21 is optional, the grinding step 21 is typically used in a preferred embodiment such that the cellulose starting material 11 (e.g., wood pulp) can be ground to form a ground flock of cellulose which can easily flow and mix in a reactor. The ground flock is also easily contacted with the alkalization reagent 12, such as by spraying the alkalization reagent onto the cellulose flock being mixed in the reactor using conventional spraying devices or means.

In the alkalization step 13, the alkalization reagent 12, such as NaOH (50% in water), and the cellulose material 11 are uniformly contacted together by mixing and by, for example using spraying devices or means to spray the alkalization reagent 12 onto the cellulose material 11, to form an activated cellulose 14 which can then proceed, as indicated by arrow 14a, to an etherification step 15. The alkalization and etherification steps of the present invention can be carried out in a single reactor or two or more reactors. In a preferred embodiment, the alkalization and etherification steps of the present invention are carried out in one reactor.

After the alkalization step 13, the activated cellulose 14 is treated with an etherification reagent 16 which is introduced, as indicated by arrow 16a, into the etherification step 15. In the etherification step 15, the etherification reagent 16 is introduced into the etherification step 15, to contact the activated cellulose 14 and to form an uncrosslinked cellulose ether 17. During the etherification step 15, the uncrosslinked cellulose ether 17 is formed at a high pressure and a high temperature which then proceeds, as indicated by arrow 17a, to the washing step 19 (hot water washing. For example, the uncrosslinked cellulose ether 17 after the etherification step 15 typically has unwanted volatile by-products and salt (NaCl); and thus, in a preferred embodiment, the uncrosslinked cellulose ether 17 after the etherification step 15, proceeds, as indicated by arrow 17a, through a washing step 19 to wash out the unwanted volatile by-products, salt, and other impurities from the uncrosslinked cellulose ether 17 followed by a granulating step 23, a drying step 24 and/or a milling step 24.

Figure 2:
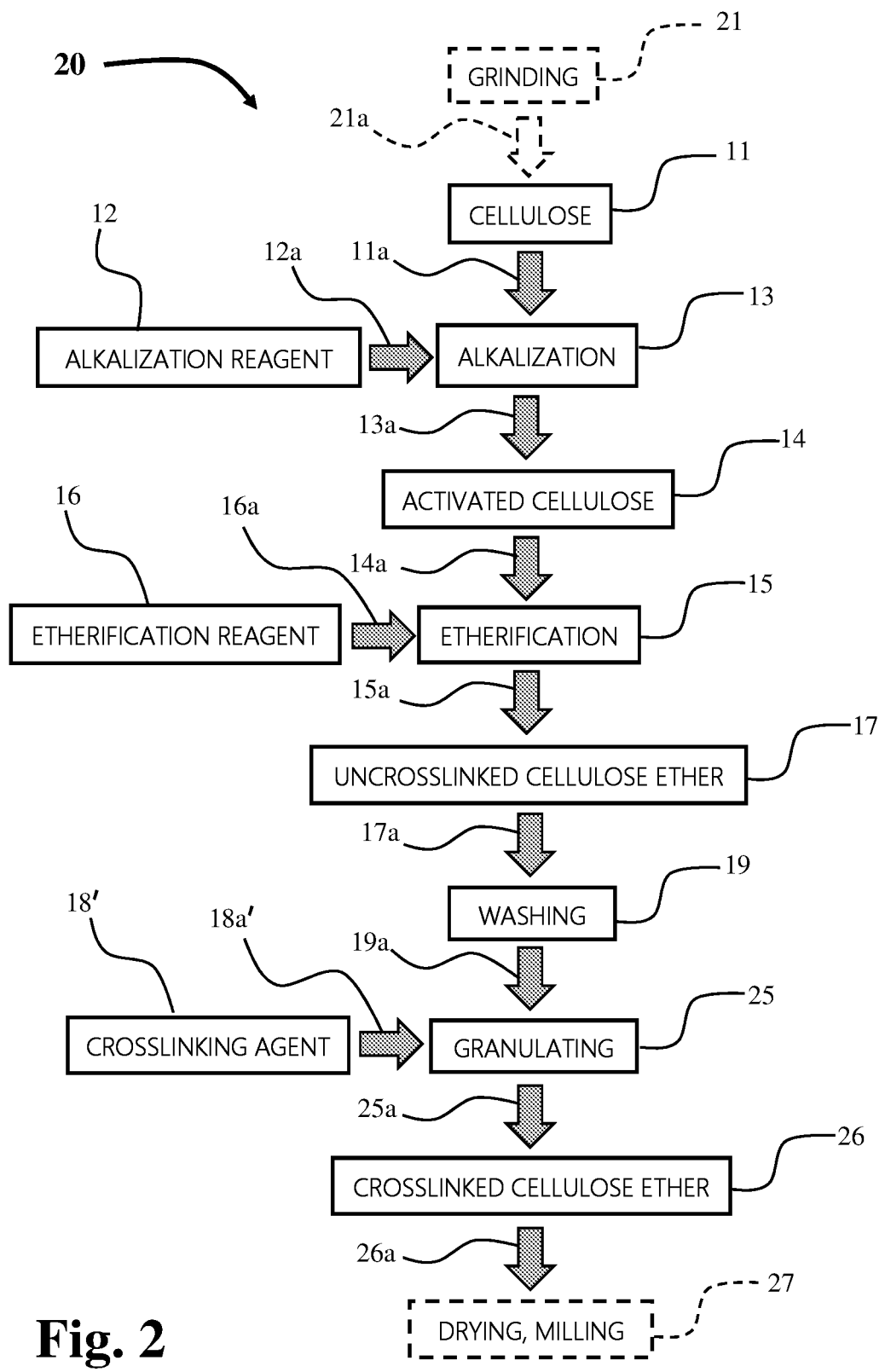
FIG. 2 is a schematic flow diagram showing another embodiment of the process of the present invention.

In the process of the present invention, the washing step is one location or point of the present invention process where a crosslinking agent can be introduced into the process (see step 19 in FIG. 1); the granulation step is another location or point of the present invention process where a crosslinking agent can be introduced into the process (see step 25 in FIG. 2). As shown in FIG. 1, a crosslinking agent or crosslinking agent 18 is added, as indicated by arrow 18a, to the washing step 19. In the washing step 19, the uncrosslinked cellulose ether 17 and crosslinking agent 18 are mixed together and washed at a high temperature (e.g., greater than [>]85° C.). The washing operation 19 is a low-pressure high temperature operation which advantageously is conducive for enabling the addition of an appropriate predetermined dosage of the crosslinking agent 18.

During the washing step 19, the uncrosslinked cellulose ether 17 remains in intimate contact with the crosslinking agent 18 and mixed together at low pressure. Then, upon addition of hot water (e.g., >90° C.) during the washing stage 19, the crosslinking agent 18 reacts with the uncrosslinked cellulose ether reactant to generate crosslinking in the uncrosslinked cellulose ether 17 to form, as indicated by arrow 19a, into a XCE 22. After the washing step 19, the hot water is removed from the XCE by filtration and/or centrifugation (not shown). By filtering and/or centrifuging the wash water from the XCE product, impurities and salt which are present in the wash water remain in the wash water and leave with the wash water as a result of the filtering and/or centrifugation. A "purified" XCE 22 in the form of a wet filter cake is produced. After filtration, the wet filter cake of the XCE 22 proceeds, as indicated by arrow 22a, to the optional granulating step 23, shown as dotted lines in FIG.

1, to form a granulated material comprising the XCE. Then, the washed and granulated XCE from the granulating step 23, can proceed, as indicated by arrow 23a, to optional process steps such as a drying and/or milling step 24 shown in dotted lines in FIG. 1.

With reference to FIG. 2, there is shown another broad embodiment of the present invention process, generally indicated by reference numeral 20, with various general process operations or steps for producing a XCE of the present invention. The process 20 utilizes the same process steps or operations as shown in FIG. 1, except that the addition of the crosslinking agent, and thus, the crosslinking reaction of the uncrosslinked cellulose ether with the crosslinking agent, occurs during the granulation step 25, when used, under slightly different process conditions. For example, as shown in FIG. 2, the process 20 of the present invention proceeds the same as the process 10 described above with reference to FIG. 1 under the same process steps and process conditions until the uncrosslinked cellulose ether 17 is prepared and ready for the washing step 19 and the granulation step 25. In the embodiment shown in FIG. 2, a crosslinking agent 18' is added, as indicated by arrow 18a', to the granulation step 25.

During the washing step 19, the uncrosslinked cellulose ether 17 is washed with hot water (e.g., >90° C.). Thereafter, the hot water can be removed from the uncrosslinked cellulose ether by filtration and/or centrifugation (not shown). After the washing step 19, the hot water contains salt and potentially other impurities. By filtering and/or centrifuging the wash water from the uncrosslinked cellulose ether product, impurities and salt which are present in the wash water remain in the wash water and leave with the wash water upon filtration to provide a "purified" uncrosslinked cellulose ether in the form of a wet filter cake. After filtration, the wet filter cake of the uncrosslinked cellulose ether proceeds, as indicated by arrow 19a, to the granulating step 25 to form a granulated material. After the washing step 19 and filtration, and during the granulation step 25, the crosslinking agent 18' is introduced or added, as indicated by arrow 18a', to the granulating step 25. The washed uncrosslinked cellulose ether filter cake (which proceeds, as indicated by arrow 19a, from the washing step 19) and the crosslinking agent 18' are then mixed together and granulated in the granulation step 25.

The granulation operation 25 shown in FIG. 2 is also a low-pressure (e.g., less than [<]500 kPa) operation similar to the washing step 19 which advantageously is conducive for enabling the addition of an appropriate predetermined dosage of the crosslinking agent 18'. Also, the addition of the crosslinking agent 18' during the granulation step 25 takes place at a temperature of from 65° C. to 100° C. in one embodiment, and from 70° C. to 90° C. in another embodiment; and then the granulated material is cool down to, for example, below 65° C. in one embodiment. During the granulation step 25, the uncrosslinked cellulose remains in intimate contact with the crosslinking agent 18' and mixed together at the low pressure (e.g., <500 kPa) and high temperature (e.g., >70° C. in one embodiment). As the granulation operation 25 proceeds, the crosslinking agent 18' reacts with the washed uncrosslinked cellulose ether reactant to generate crosslinking in the uncrosslinked cellulose ether 17. After the granulation operation 25, the uncrosslinked cellulose ether is transformed, as indicated by arrow 25a, into a granulated material comprising the XCE 26. Then, the granulated XCE 26 can proceed, as indicated by arrow 26a, to other optional process steps such as a drying step 27 and/or a milling step 27 shown in dotted lines in FIG. 2.

As aforementioned, after the washing and granulation steps, the XCE product of the present invention can be conveyed, as indicated by arrow 22a in FIG. 1 and arrow 26a in FIG. 2, to one or more further optional operations or steps 24 and 27, shown in dotted lines in FIG. 1 and FIG. 2, respectively. For example, the optional steps can be selected from steps known to those skilled in the art such as: a further purifying process to remove unwanted impurities; a drying step for drying the granulated XCE; and/or a milling step for forming the XCE into a powder product. Each of the above optional operations can be carried out in a single step operation; or two or more of the above optional steps can be combined into one operation, if desired. Although the steps 24 and 27 are optional, one or more of the steps 24 and 27 are typically desired and used in the process of the present invention. For example, in one preferred embodiment, the XCE product can then be conveyed, as indicated by arrow 22a, to a drying/milling step 24 shown in dotted lines in FIG. 1 and drying/milling step 27 shown in dotted lines in FIG. 2; or the XCE product produced by the process of FIG. 1 or FIG. 2 can be passed on to further processing steps and/or to storage.

The starting raw material used to make the cellulose ether of the present invention and added into the alkalization operation of the XCE production process is cellulose. Cellulose pulp is typically obtained from, for example, wood pulp or cotton linters pulp. The pulp is typically ground, using conventional grinding means, to provide the cellulose in a powder or flock form. In one preferred embodiment, the suitable cellulose starting material useful in the present invention includes ground wood pulp, ground cotton linters pulp, and mixtures thereof. In another preferred embodiment, wood pulp is used in the process; and the wood pulp is ground into a ground flock of cellulose as a means of making the cellulose more flowable when added into the alkalization process step.

The alkalization reagent (or alkalizing agent) that is used to contact the cellulose material during the alkalization step of the present invention process includes, for example, one or more alkalization reagents known in the art. For example, the alkalization reagent includes solutions of an alkali metal hydroxide such as sodium hydroxide (NaOH), potassium hydroxide (KOH), lithium hydroxide (LiOH), and mixtures thereof. Although in some embodiments, the aqueous alkaline solutions of KOH or LiOH are suitable for use as the alkalization reagent, for economic reasons, the alkali metal hydroxide used as the alkalization reagent in the present invention is an aqueous NaOH solution. In a preferred embodiment, the alkali metal hydroxide used in the present invention is a 50% caustic soda, available from The Dow Chemical Company. The alkalization reagent is used to alkalize natural cellulose or cellulose hydrate when carrying out the process of the present invention, in one preferred embodiment.

Generally, the alkalization reagent is in the form of an aqueous mixture of the alkalization reagent in water (e.g., a 50% NaOH in water); and the concentrations of the aqueous solutions may vary. For example, the aqueous solution ranges from 10 weight percent (wt %) to 90 wt % in one embodiment, from 25 wt % to 75 wt % in another embodiment and from 40 wt % to 60 wt % in still another embodiment, based on weight percent of water. In a preferred embodiment, the aqueous solution is used as a 50% alkalization reagent in water.

As aforementioned, the alkalization reagent is incorporated or introduced into the process during the alkalization step of the process, for example as an alkali solution and more specifically 50% NaOH in water.

The alkalization reagent is used to alkalize or "activate" the cellulose starting material and to form an "activated cellulose ether material" in the process of the present invention. The at least one cellulose material is contacted with the alkalization reagent wherein the alkalization reagent alkalizes the cellulose under process conditions to form the activated cellulose material. The contacting step is carried out, for example, by known means such as by spraying and mixing the alkalization reagent with the cellulose.

The water used in the alkalization reagent is obtained from any source. The different types of water include, for example, tap water, potable water, and deionized water. The alkalization reagent is formed by mixing the alkalization reagent and water by conventional mixing.

The alkalization reagent added during the alkalization step to contact the cellulose material can be carried out by any known addition means, for example, by spraying and other means known to those skilled in the art that enables a uniform distribution of the NaOH, to ensure a sufficient activation of the cellulose pulp.

The alkalization step of the process is carried out under low pressure and low temperature conditions. For instance, the pressure of the alkalization step is in the range of, for example, from 100 kPa to 500 kPa in one embodiment, from 150 kPa to 450 kPa in another embodiment and from 200 kPa to 400 kPa in still another embodiment. The above pressure ranges are the typical pressure level ranges in the reactor during the alkalization step.

And, for instance, the temperature of the alkalization step of the process is in the range of, for example, from 10° C. to 50° C. in one embodiment, from 15° C. to 45° C. in another embodiment and from 20° C. to 40° C. in still another embodiment. The above temperature ranges are the typical temperature ranges in the reactor during the alkalization step.

In general, the etherification reagent is added to the etherification step of the process and is mixed with the activated cellulose material; so that the etherification reagent with the cellulose material forms a uniform reaction mixture which, in turn, under the process of etherification, reacts to form a cellulose ether. To produce a cellulose ether in accordance with the process of the present invention, an etherification reagent is mixed with the activated cellulose material prepared in the alkalization step described above. The etherification reagent used for preparing the cellulose ether includes, for example, one or more etherification reagents known in the art. For example, the etherification reagent can include ethylene oxide (EO), propylene oxide (PO), butylene oxide (BO), methyl chloride, ethyl chloride, and mixtures thereof. In one preferred embodiment, the etherification agent useful in the present invention is, for example, methyl chloride, propylene oxide, ethylene oxide and mixtures thereof.

The amount of the etherification reagent added into the etherification operation of the XCE production process includes, for example, from 4 moles of the etherification agent per moles of anhydroglucose units of the cellulose ether (mol/AGU) to 6 mol/AGU in one embodiment, from 4.5 mole/AGU to 5.5 mol/AGU in another embodiment and from 4.7 mol/AGU to 5.3 mol/AGU in still another embodiment. If the amount of etherification reagent used is <4 mol/AGU, the cellulose ether can be under-substituted and not fully water soluble. If the amount of etherification reagent used is >6 mol/AGU, this higher dosage of etherification reagent can cause the cellulose ether to become hydrophobic and water solubility decreases.

The etherification reagent added to the etherification step to contact the activated cellulose can be carried out by any known addition means, for example, by flushing the gas into the reactor using conventional equipment known in the art.

The etherification step of the process is carried out, for example, in a reaction vessel (reactor) under an inert atmosphere. The inert material used in the process includes, for example, $N_2$, argon, and mixtures thereof. During the etherification step of the process and as the reaction of the reactants occurs and progresses to form a cellulose ether material, the pressure and temperature increase as a result of an exothermic reaction.

As the cellulose ether forms during the etherification step, the pressure of the etherification step of the process is in the range of, for example, from 1,500 kPa to 2,500 kPa in one embodiment, from 1,600 kPa to 2,400 kPa in another embodiment and from 1,800 kPa to 2,200 kPa in still another embodiment. At a pressure of <1,500 kPa, the reaction rate is too slow; and at a pressure of >2,500 kPa, special high-pressure equipment is necessary.

The etherification step of the process also includes a temperature of, for example, from 60° C. to 100° C. in one embodiment, from 70° C. to 90° C. in another embodiment, and from 75° C. to 85° C. in still another embodiment. At a temperature of <60° C., the reaction rate becomes unacceptably slow; and at a temperature of >100° C., unwanted side reactions occur and the pressure increases. If the pressure increases beyond, for example, 3,000 kPa different pressure reactors which can handle high pressures and which are more expensive will be required.

In one preferred embodiment of the process, after the etherification step described above, the crosslinking of the uncrosslinked cellulose ether occurs in the washing/granulation stage of the process. The crosslinking is carried out by introducing a crosslinking agent into the washing/granulation stage of the process because at the washing/granulation stage the addition of the crosslinking agent is easily done at low pressure conditions of the washing/granulation stage.

Generally, the crosslinking agent useful in the present invention includes a mixture of: (i) at least one crosslinking agent; (ii) a dilution medium; and (iii) any other optional components desired.

The crosslinking agent that is used to prepare the cellulose ether of the present invention includes, for example, one or more crosslinking agents known in the art. However, in a preferred embodiment, the crosslinking agent useful in the present invention, in general, is a non-water soluble crosslinking agent or a crosslinking agent having a solubility of <10 percent (%) in water. Because the crosslinking agent in a preferred embodiment is added to the process where water is present, it is desired to use a crosslinking agent that is non-water soluble to prevent, for example, the occurrence of hydrolysis and other undesired side reactions. By "non-water soluble", with reference to a crosslinking agent, it is meant a crosslinking agent having no water solubility or having a low (weak or poor) water solubility of <10%. In other embodiments, the water solubility of the crosslinking agent can be from 0% to <9% and from 0% to <8%. The water solubility of the crosslinking agent can be measured by thermographic analysis as known in the art.

For example, the non-water solubility property of the crosslinking agent allows optimization of desirable side reactions with the hydroxyl (—OH) groups of the cellulose backbone to take place and minimizes the undesirable side reactions with the —OH groups of the water available in the washing and granulation operation step.

Crosslinking agents suitable for use in the present invention include, for example, compounds having a polyoxyalkylene or polyalkylene glycol group and two or more, preferably, two crosslinking groups, such as halogen groups, glycidyl or epoxy groups, or ethylenically unsaturated groups, e. g. vinyl groups, that form ether bonds with the cellulose ether in crosslinking the cellulose ether. Suitable bifunctional compounds include, for example, 1, 2-dichloro (poly) alkoxy ethers, dichloropolyoxyethylene, diglycidyl polyalkoxy ethers, diglycidyl phosphonate, divinyl polyoxyalkylenes containing a sulphone group; and mixtures thereof. Compounds which bear two different functional groups can also be used. Examples of the compounds containing two different functional groups include diglycidyl polyoxypropylenes; glycidyl (poly) oxyalkyl methacrylate; and mixtures thereof.

In one preferred embodiment, the crosslinking agent useful in the present invention can be based on diglycidyl ether chemistry. For example, the crosslinking agent can be a diglycidylether type crosslinking agent as illustrated by the following chemical Structure (I):

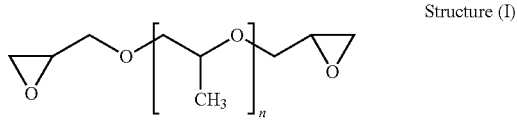

Structure (I)

where, in the above Structure (I), "n" can be from 3 to 25 in one embodiment, from 7 to 20 in another embodiment, and from 9 to 15 in still another embodiment.

Exemplary of some of the commercial crosslinking agents useful in the present invention include, for example, crosslinking agents based on diglycidyl ether chemistry. Commercial crosslinking agents useful in the present invention that are based on diglycidyl ether chemistry, include for example Epilox P13-42 where this product is Structure (I) when n equals (=) approximately (~) 8; and Epilox M985 where this product is Structure (I) when n=~13 (both available from Leuna—Harze GmbH); and mixtures thereof. Epilox M985 poly(propyleneglycol) diglycidylether crosslinking agent is a linear poly (propyleneglycol) diglycidylether made from polypropylene glycol (PPG) having a Mw of ~925 Daltons (Da).

Crosslinking agents such as Epilox M985 and Epilox P13-42 are examples of preferred embodiments because beneficially such crosslinking agents: (1) are non-toxic; and (2) have a very high boiling point (e.g., >200° C.)/high Mw (e.g., >600 g/mol). This is in contrast to some of the known crosslinking agent systems used in the prior art, such as epichlorohydrin, which: (1) is toxic and/or carcinogenic; and (2) has a low boiling point (e.g., 116° C.)/low Mw (e.g., 92.53 g·mol$^{-1}$) and (3) shows no desired viscosity increase.

With the use of crosslinking agents such as Epilox, the building-up of real covalent bindings takes place with the cellulose ether. This building of covalent bindings advantageously increases the Mw of the cellulose ether resulting in higher viscosity of the aqueous solution. The cellulose ether of the present invention having a higher Mw, provides a means for reaching beneficial properties, for example, a high viscosity level of the aqueous solution (e.g., >15% higher in one embodiment, and 20% higher in another embodiment, compared to the viscosity of the uncrosslinked [i.e., non-crosslinked] cellulose ether) and a reduced dosage level in applications (e.g. cementitious tile adhesives).

Exemplary of some other advantageous properties exhibited by the crosslinking agent can include providing a shift of the crossover value of the XCE to lower frequencies compared to the uncrosslinked cellulose ethers, indicating a higher gel characteristic of the XCE. In addition, when using the XCE of the present invention, the amount of the XCE necessary to obtain the desired performance, for example when used in a mortar formulation, is reduced. Such reduction of XCE dosage, in turn, reduces the cost in use that correlates with the reduce amount of cellulose ether that is necessary to obtain the desired performance, for example, in the application of cementitious tile adhesives.

In general, the amount of crosslinking agent used in the process of the present invention may range from 0.0001 eq to 0.05 eq, where the unit "eq" represents the molar ratio of moles of the respective crosslinking agent relative to the number of moles of anhydroglucose units (AGU) of the cellulose ether. The amount of crosslinking agent used in the process is generally from 0.0005 eq to 0.03 eq in one embodiment and from 0.001 eq to 0.02, eq in another embodiment. When the amount of crosslinking agent used is above 0.05 eq over-crosslinking of the XCE occurs; and thus, the XCE becomes insoluble. When the amount of crosslinking agent used is below 0.0001 eq, a viscosity increase of a XCE, for example in a 1% solution, may not be detectable.

While the crosslinking action of the cellulose ether to produce the XCE of the present invention can take place, for example, before, during or after the etherification process step of the process; in a preferred embodiment, the crosslinking reaction is generated after the etherification step and during the wash step and/or the granulation step of the process as described above. Crosslinking a cellulose ether to produce a XCE is a well-known reaction and is described for example in U.S. Pat. No. 6,958,393 B2. In general, the cellulose ether that undergoes crosslinking with the crosslinking agent is typically a mixed cellulose ether that contains hydroxyalkyl groups and alkyl ether groups. For example, in one embodiment the mixed cellulose ether that contains hydroxyalkyl groups and alkyl ether groups, includes an alkyl hydroxyethyl cellulose, such as hydroxyalkyl methylcellulose.

In some embodiments, exemplary of cellulose ether compounds suitable for use in the present invention include methylcellulose (MC), ethyl cellulose, propyl cellulose, butyl cellulose, hydroxyethyl methylcellulose (HEMC), hydroxypropyl methylcellulose (HPMC), hydroxyethyl cellulose (HEC), methyl hydroxyethyl hydroxy propyl cellulose (MHEHPC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), sulfoethyl hydroxyethylcelluloses (SEHEC), and mixtures thereof. In some preferred embodiments, the mixed cellulose ether can include, for example, HEMC, HPMC, and mixtures thereof.

For the cellulose ethers useful in the present invention, alkyl substitution is described in cellulose ether chemistry by the term "DS", as determined by the Zeisel method. The DS is the mean number of substituted OH groups per anhydroglucose unit. The methyl substitution may be reported, for example, as DS (methyl) or DS (M). The hydroxy alkyl substitution is described by the term "MS", as determined by the Zeisel method. The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Z. Anal. Chem. 286 (1977), 161-190).

The XCE produced by the process of the present invention includes, for example, any of the above-mentioned cellulose ethers with a degree of alkyl substitution. For example, a crosslinked HEC has a degree of substitution MS (HE) of 1.5 to 4.5 in one embodiment and has a degree of substitution MS (HE) of 2.0 to 3.0 in another embodiment. In still another embodiment, mixed ethers of methyl cellulose to be crosslinked can be used in the process of the present invention. For example, in the case of HEMC, DS (M) values range from 1.2 to 2.1 in one embodiment, from 1.3 to 1.7 in another embodiment, and from 1.35 to 1.6 in still another embodiment; and MS (HE) values range from 0.05 to 0.75 in one embodiment, from 0.15 to 0.45 in another embodiment, and from 0.20 to 0.40 in still another embodiment. In the case of HPMC, DS (M) values range from 1.2 to 2.1 in one embodiment and from 1.3 to 2.0 in another embodiment; and MS (HP) values range from 0.1 to 1.5 in one embodiment and from 0.2 to 1.2 in another embodiment.

After the etherification step and the washing/granulation step described above, the XCE product produced can be processed through various additional optional processing steps. For example, the resultant XCE can be further purified, dried, milled, and/or ground to a powder form using conventional methods customarily used to produce cellulose derivative products and powders therefrom. For example, before or after washing, the volatile organic constituents present in the XCE can be reduced or removed from the XCE product by distillation or steam stripping. The optional steps are well known to those skilled in the art and any of the methods described above can be used in the process of the present invention. For example, after the washing step described above, typically the XCE is filtered to produce a filter cake; and the filter cake is then processed in a granulation step to form granulated material. Thus, of the various optional steps described above, in one preferred embodiment, it is desirous to carry out at least the drying step and the milling step of the XCE product to form a dry powder product for ease of handling, packaging and storage purposes.

Some of the advantageous properties exhibited by the XCE made by the above process of the present invention include, for example, the aqueous solution of the XCE exhibits an enhanced viscosity or an ultrahigh viscosity of the aqueous solution. The increased viscosity enables the use of a reduced dosage of the XCE in, for example, a mortar formulation application.

For example, the increased viscosity of the XCE aqueous solution produced by the process of the present invention includes a viscosity increase of more than 15% in one embodiment, more than 20% in another embodiment, more than 30% in still another embodiment, and more than 50% in yet another embodiment when compared to an uncrosslinked cellulose ether aqueous solution.

In one broad embodiment, the XCE of the present invention may be used as an additive for a drymix mortar formulation, renders, cement extrusion, and the like. For example, in the process of making the drymix mortar formulation, the process includes the steps of mixing: (I) the XCE described above which is used as a water retention agent; and (II) desired conventional drymix mortar formulation components such as a hydraulic binder including for example, cement.

In a preferred embodiment, a mortar formulation can be prepared mixing the components (I) and (II) (e.g., a physical blend of solid powders) by conventional mixing means as known in the art. Some of the advantageous properties exhibited by the mortar formulation can include, for example, the capability using a lower dosage of the XCE (>10%) resulting in lower formulation costs. To prepare the mortar formulation, generally, the amount of the XCE used as a water retention agent component (I) can be, for example, from 0.01 wt % to 1.0 wt % in one embodiment, from 0.05 wt % to 0.8 wt % in another embodiment and from 0.1 wt % to 0.5 wt % in still another embodiment. Below these levels the water retention of the mortar is insufficient and above these limits the cost of the formulation becomes too high.

The conventional drymix mortar formulation components, component (II), may include components such as hydraulic binders such as cement, fly ash, furnace slag, and the like, and aggregates (sand), fine fillers (calcium carbonate, fumed silica, dolomite, and the like), air entraining agent, defoamers, re-dispersible polymer powders, hydrophobic agents; and mixtures thereof.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) which follow are explained hereinbelow and in Tables II to VI.

"HEMC" stands for hydroxyethyl methyl cellulose.

"AGU" stands for anhydroglucose units of the cellulose ether.

"LVN" stands for limiting viscosity number of the pulp as measured according to the procedure described in ISO 5351 (2010).

Various raw materials or ingredients used in the Examples are explained as follows:

Epilox M 985 and Epilox P13-42 are poly(propylene glycol) diglycidylethers available from Leuna Harze GmbH.

Comparative Examples A and B—Dosage of Crosslinking Agent at Etherification Step Ground cellulose flock (1.5 mol, LVN=≥1,450 milliliters per gram [mL/g]) was added to a 5 liter (L) autoclave (reactor).

After purging the autoclave thrice with $N_2$ gas, the reactor was heated to 40° C. Then, dimethyl ether (DME, 4.7 mol/mol AGU), and a first charge of methyl chloride ("MCl 1"; 3.2 mol/mol AGU) were added into the autoclave. A first charge of caustic soda ("NaOH 1"; strength 50 wt %, 1.9 mol NaOH/mol AGU) was added into the autoclave in three portions during 2 minutes (min) at a temperature of 40° C. The reaction mixture was held at 40° C. for 30 min. After 30 min, ethylene oxide (0.45 mol/mol AGU) was then added to the reaction mixture and the reaction mixture was held for an additional 10 min at 40° C.

After 10 min, a specified amount of crosslinking agent (Epilox M985 at 0-0.003 mol/mol AGU) was added to the reaction mixture. Epilox M985 was dissolved in 20 milliliters (mL) of isopropanol and the resulting solution was added into the autoclave in six increments in 30-second (30 s) intervals.

The resultant mass was heated to 80° C. in 45 min. At 80° C., a second charge of methyl chloride ("MCl 2"; 1.3 mol/mol AGU) was injected quickly to the mass in the autoclave. Afterwards, a second charge of caustic soda ("NaOH 2"; 0.67 mol/mol AGU) was added into the autoclave in 7 portions over 30 min followed by a 70 min cook-off time at 80° C.

After the above steps, the following conventional process steps were carried out on the resultant mass from the autoclave: hot water washing; granulation; drying; and milling using standard procedures known in the art.

Inventive Examples 1-3 and Comparative Example C—Dosage of Crosslinking Agent at Granulation Step (See the Process Shown in FIG. 2.)

To a Loedige reactor was added 1,126.8 grams (g) of water wet HEMC filter cake (dry content=52.2%) [DS(M) 1.58, MS(HE) 0.29) and the filter cake was heated to 80° C. in 60 min (sheath temperature 50 min 125° C., 10 min 97° C.) using a rotor speed of 180/min. Then, 462.2 g of water was added over the reactor dome to enhance the humidity of the filter cake to 63%. The filter cake was mixed for 30 min at 80° C. using the above same rotator speed of 180/min.

At 80° C., the crosslinking agent Epilox M 985 (0-0.012 mol/mol AGU) was added to the filter cake as follows: Epilox M 985 was first dissolved in isopropyl alcohol (IPA) (as described in Table II). Then, the resultant solution was added to the filter cake in six increments in 30 s intervals.

TABLE II

| Epilox M 985 Dosage (mol/mol AGU) | Epilox M 985 Added to Reactor (g) | IPA* |
|---|---|---|
| 0.000 | — | 0 mL |
| 0.003 | 8.56 | 20 mL |
| 0.006 | 17.13 | 40 mL |
| 0.012 | 34.25 | 80 mL |

*"IPA" stands for isopropyl alcohol

The filter cake was mixed for 120 min at 80° C. and then cooled down to room temperature (~23° C.). An additional step of dry/milling was then performed.

TABLE III

| Example No. | Epilox M985 Dosage (mol/mol AGU) | V1* (mPa · s) |
|---|---|---|
| Comparative Example C | 0.000 | 9,304 |
| Inventive Example 1 | 0.003 | 13,890 |
| Inventive Example 2 | 0.006 | 12,570 |
| Inventive Example 3 | 0.012 | 11,730 |

*"V1" stands for viscosity of a 1% aqueous solution.

The process of Inventive Examples 1-3 requires no additional cost intensive equipment that is normally used for the dosage of the crosslinking agent at high pressure. The known process (Comparative Example B), on the other hand, does requires cost intensive equipment for the dosage of the crosslinking agent at high pressure.

The viscosity measurements were carried out in a 1% aqueous solution at 20° C. using a Haake RS 1 rheometer at a shear rate of 2.52 $s^{-1}$.

As seen in Table IV using the process of the present invention resulted in a XCE product with a similar viscosity increase versus an uncrosslinked cellulose ether using the state-of-the art process. One of the benefits of the present invention process is that by using the process a broader process window is made available. For example, as described in Table III, the increase of the crosslinking agent amount from 3 millimoles (mmol) to 6 mmol only minimally effects the resulting viscosity of the XCE. In contrast using the process of the Comparative Examples, only a narrow process window is available. The dosage of crosslinking agent used in the present invention has the further benefit of an enhanced process window compared to a comparative conventional process. Over dosage results in a significant viscosity loss where in the present invention process only a low viscosity reduction was seen.

TABLE IV

| Example No. | Epilox M 985 Dosage (mole/mole AGU) | V1* (mPa · s) | Viscosity Increase |
|---|---|---|---|
| Comparative Example A | — | 10,500 | |
| Comparative Example B | 0.003 | 15,100 | 49% |
| Comparative Example C | — | 9,304 | |
| Inventive Example 1 | 0.003 | 13,890 | 49% |

*"V1" stands for viscosity of a 1% aqueous solution.

As shown by the results in Table IV, a viscosity increase of 49% can be observed with the use of the present invention process (see Inventive Example 1 versus Comparative Example C) and the viscosity increase of 49% was the same as the viscosity increase based on the comparative process (see Comparative Example B versus Comparative Example A); however a viscosity increase using the present invention process can be obtained with less process effort.

Comparative Examples D-F—Crosslinking Agent: Epichlorohydrin Used at Granulation Step 1481 g water wet HEMC filter cake (dry content=62%) [DS(M)1.32, MS(HE)0.21) was added to a Loedige reactor and heated to 80° C. in 60 min (sheath temperature 50 min 125° C., 10 min 97° C.) using a rotor speed of 180/min. Then 40 g water was added over the reactor dome to enhance the humidity of the filter cake to 63%. The filter cake was mixed for 30 min at 80° C. using the same rotator speed.

At 80° C., the crosslinking agent epichlorohydrin (3 mmol/mol AGU) diluted in 20 mL isopropyl alcohol was added in six increments in 30 s intervals.

The filter cake was mixed for 120 min at 80° C. and then cooled down to room temperature. The following steps were carried out on the filter cake: drying and milling. The results of Comparative Examples D-F

TABLE V

| Example No. | Crosslinking Agent | Crosslinking Dosage Agent (mol/mol AGU) | Viscosity (mPa · s @2.52 s$^{-1}$ 1% Aqueous Solution |
|---|---|---|---|
| Comparative Example D | none | none | 4,300 |
| Comparative Example E | epichlorohydrin | 0.003 | 3,900 |
| Comparative Example F | epichlorohydrin | 0.003 | 4,200 |

Inventive Examples 4-6 and Comparative Example G—Dosage of Crosslinking Agent at Washing Step (See the Process Shown in FIG. 1.)

175 g water wet HEMC Filter cake (dry content=56%) [DS(M)1.58, MS(HE)0.29, NaCl 2.43%] was dispersed in 2-2.5 L hot (>90° C.) water using a high-speed mixer (a 10,000 rpm IKA T50 basic Ultra Turrax mixer, available from IKA®-Werke GmbH & Co. KG). After 5 min, the MHEC was uniformly dispersed and the crosslinking agent Epilox P13-42 (0-0.015 mol/mol AGU) was added. (Epilox MP13-42 was dissolved in 20 mL of IPA; and the resultant solution was added in six increments in 30 s intervals.) The resulting suspension was stirred for 2 hours (hr) at a temperature of more than 90° C. The resulting product was isolated using a metal suction filter. Then the resulting product was further processed using the following process steps: granulation, drying and milling.

The process used in this Example required no additional cost intensive equipment normally used for the dosage of the crosslinking agent at high pressure. The Comparative Example process, on the other hand, required cost intensive equipment for the dosage of the crosslinking agent at high pressure.

The crosslinking agent used was Epilox P13-42 having the following general chemical structure where n is 9:

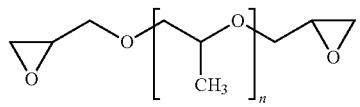

Epilox P13-42 is a diglycidylether based on polyoxypropylene glycol having a Mw of 680 g/mol.

Viscosity measurements were performed on 1% by weight cellulose ether aqueous solutions at a shear rate of 2.52 s$^{-1}$, 20° C. using a Haake Rheometer.

TABLE VI

| Example No. | Crosslinking Agent Dosage (mol/mol AGU) | V1* (mPa · s) |
|---|---|---|
| Comparative Example G | 0 | 10,210 |
| Inventive Example 4 | 0.004 | 14,390 |
| Inventive Example 5 | 0.008 | 16,040 |
| Inventive Example 6 | 0.015 | 13,980 |

*"V1" stands for viscosity of a 1% aqueous solution.

As shown by the results in Table VI, a viscosity increase of 44% can be observed for the XCE obtained using the present invention process (see Inventive Example 4 versus Comparative Example G) and the viscosity increase of 44% is in the same range of the viscosity increase of the XCE of the present invention compared to a XCE obtained using a conventional process (see Table IV wherein Comparative Example B versus Comparative Example A shows a viscosity increase of 49%). However, a viscosity increase of the XCE obtained using the process of the present invention can be obtained with less process effort, i.e., no additional devices for crosslinking agent dosage are required to obtained the beneficial viscosity increase of the XCE of the present invention.

One additional benefit of the present invention process is that by using the process of the present invention, a broader process window is made available. For example, as described in Table III, the increase of the crosslinking agent amount from 4 mmol to 15 mmol only minimally effects the resulting viscosity of the XCE. In contrast, using the process of the Comparative Examples, only a narrow process window is available. The dosage of crosslinking agent used in the present invention has the further benefit of an enhanced process window compared to a comparative conventional process. Over dosage results in a significant viscosity loss where in the present invention process only a low viscosity reduction was seen.

What is claimed is:
1. A process for producing a water soluble crosslinked cellulose ether comprising the steps of:
(a) contacting at least one cellulose material with at least one alkalization reagent to form an activated cellulose material;
(b) contacting the activated cellulose material of step (a) with at least one etherification reagent to form an uncrosslinked cellulose ether, wherein the uncrosslinked cellulose ether forms at a pressure of greater than or equal to 1,000 kilopascals;
(c) subjecting the uncrosslinked cellulose ether of step (b) to a step selected from:
(ci) a washing step and a granulating step, wherein the washing step and the granulating step are performed simultaneously and wherein the washing step comprises washing with water at a temperature of greater than 90° C.; or
(cii) a washing step and a granulating step, wherein the washing step is a step separate from the granulating step; wherein the washing step comprises washing with water at a temperature of greater than 90° C.; and wherein the washing step and the granulating step are performed separately in a stepwise procedure; or
(ciii) a washing step only, wherein the washing step comprises washing with water at a temperature of greater than 90° C.; or
(civ) a granulating step only, wherein the granulating step is carried out at a pressure of less than 500 kilopascals; and
(d) adding at least one crosslinking agent to the uncrosslinked cellulose ether such that the at least one crosslinking agent and the uncrosslinked cellulose ether form a water soluble crosslinked cellulose ether; wherein the crosslinking agent is added to the process:

(di) during the washing step (ci) while washing with water at a temperature of greater than 90° C. and during the granulating step (ci); or
(dii) during the washing step (cii) while washing with water at a temperature of greater than 90° C. and during the granulating step (cii); or
(diii) only during the washing step (cii) while washing with water at a temperature of greater than 90° C.; or
(div) only during the granulating step (cii); or
(dv) during the washing step (ciii) while washing with water at a temperature of greater than 90° C.; or
(dvi) during the granulating step (civ);
wherein the at least one crosslinking agent of step (d) is a diglycidylether type crosslinking agent having the following chemical Structure (I):

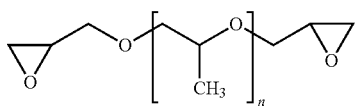

Structure (I)

where n is from 3 to 25.

2. The process of claim 1, further including the step of subjecting the crosslinked cellulose ether from step (d) to one or more steps of purifying, drying, and milling.

3. The process of claim 1, wherein the at least one cellulose material of step (a) is selected from the group consisting of wood pulp, cotton linters, and mixtures thereof; and wherein the at least one alkalization reagent of step (a) is selected from the group consisting of solutions of sodium hydroxide, potassium hydroxide, lithium hydroxide, and mixtures thereof.

4. The process of claim 1, wherein the at least one etherification reagent of step (b) is selected from the group consisting of ethylene oxide, propylene oxide, butylene oxide, methyl chloride, ethyl chloride, and mixtures thereof.

5. The process of claim 1, wherein the activated cellulose material in step (a) forms at a pressure of less than or equal to 500 kilopascals and at a temperature of less than or equal to 50° C.

6. The process of claim 1, wherein the uncrosslinked cellulose ether in step (b) forms at a temperature of greater than 70° C.

7. The process of claim 1, wherein step (c) and step (d) are carried out at a pressure of less than or equal to 500 kilopascals.

8. The process of claim 1, wherein step (a) and step (b) are carried out in an inert atmosphere.

9. The process of claim 1, wherein the etherification reagent in the contacting step (b) is added to the activated cellulose material at a concentration of from 4 moles of the etherification reagent per mole of anhydroglucose units of the activated cellulose material to 6 moles of the etherification reagent per moles of anhydroglucose units of the activated cellulose material.

10. The process of claim 1, wherein the at least one crosslinking agent is added in the addition step (d) at a concentration of from 0.0001 moles of the crosslinking agent per moles of anhydroglucose units of the cellulose ether to 0.05 moles of the crosslinking agent per moles of anhydroglucose units of the cellulose ether.

11. The process of claim 1, including further the step of grinding the at least one cellulose material to form a ground cellulose flock material; and wherein the grinding step is carried out prior to contacting the at least one cellulose material with the at least one alkalization reagent in step (a).

12. The process of claim 1, wherein the water soluble crosslinked cellulose ether is hydroxyethyl methylcellulose or hydroxypropyl methylcellulose having a degree of substitution of 1.3 or greater.

13. The process of claim 1, wherein the water soluble crosslinked cellulose ether is nonionic.

14. A process for producing a water soluble, nonionic crosslinked cellulose ether comprising the steps of:
(a) contacting at least one cellulose material with at least one alkalization reagent to form an activated cellulose material;
(b) contacting the activated cellulose material of step (a) with at least one etherification reagent to form an uncrosslinked cellulose ether, wherein the uncrosslinked cellulose ether forms at a pressure of greater than or equal to 1,000 kilopascals;
(c) subjecting the uncrosslinked cellulose ether of step (b) to a step selected from:
(ci) a washing step and a granulating step, wherein the washing step and the granulating step are performed simultaneously and wherein the washing step comprises washing with water at a temperature of greater than 90° C.; or
(cii) a washing step and a granulating step, wherein the washing step is a step separate from the granulating step; wherein the washing step comprises washing with water at a temperature of greater than 90° C.; and wherein the washing step and the granulating step are performed separately in a stepwise procedure; or
(ciii) a washing step only, wherein the washing step comprises washing with water at a temperature of greater than 90° C.; or
(civ) a granulating step only, wherein the granulating step is carried out at a pressure of less than 500 kilopascals; and
(d) adding at least one crosslinking agent to the uncrosslinked cellulose ether such that the at least one crosslinking agent and the uncrosslinked cellulose ether form a water soluble, nonionic, crosslinked cellulose ether; wherein the crosslinking agent is added to the process:
(di) during the washing step (ci) while washing with water at a temperature of greater than 90° C. and during the granulating step (ci); or
(dii) during the washing step (cii) while washing with water at a temperature of greater than 90° C. and during the granulating step (cii); or
(diii) only during the washing step (cii) while washing with water at a temperature of greater than 90° C.; or
(div) only during the granulating step (cii); or
(dv) during the washing step (ciii) while washing with water at a temperature of greater than 90° C.; or
(dvi) during the granulating step (civ);
wherein the at least one crosslinking agent of step (d) is a diglycidylether type crosslinking agent having the following chemical Structure (I):

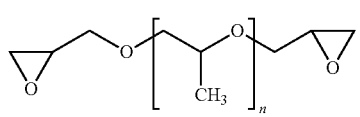

Structure (I)

where n is from 3 to 25, and wherein the at least one crosslinking agent is added in the addition step (d) at a concentration of from 0.0001 moles of the crosslinking agent per moles of anhydroglucose units of the cellulose ether to 0.05 moles of the crosslinking agent per moles of anhydroglucose units of the cellulose ether.

\* \* \* \* \*